United States Patent
Yu et al.

(10) Patent No.: US 9,578,534 B2
(45) Date of Patent: Feb. 21, 2017

(54) METHOD AND DEVICE FOR MEASURING INTERFERENCE IN COMMUNICATION SYSTEM

(71) Applicant: Samsung Electronics Co., Ltd., Suwon-si, Gyeonggi-do (KR)

(72) Inventors: Hyoung-Youl Yu, Seoul (KR); Youn-Sun Kim, Seongnam-si (KR); Hyo-Jin Lee, Seoul (KR); Hyoung-Ju Ji, Seoul (KR); Ju-Ho Lee, Suwon-si (KR); Seung-Hoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/440,454

(22) PCT Filed: Nov. 1, 2013

(86) PCT No.: PCT/KR2013/009856
§ 371 (c)(1),
(2) Date: May 4, 2015

(87) PCT Pub. No.: WO2014/069941
PCT Pub. Date: May 8, 2014

(65) Prior Publication Data
US 2015/0341814 A1    Nov. 26, 2015

(30) Foreign Application Priority Data

Nov. 2, 2012  (KR) .......................... 10-2012-0123768
Nov. 13, 2012 (KR) .......................... 10-2012-0128061

(51) Int. Cl.
H04W 24/10  (2009.01)
H04B 7/02   (2006.01)
(Continued)

(52) U.S. Cl.
CPC ............. *H04W 24/10* (2013.01); *H04B 7/024* (2013.01); *H04B 7/04* (2013.01); *H04B 7/068* (2013.01);
(Continued)

(58) Field of Classification Search
CPC ........ H04W 24/10; H04B 7/024; H04B 7/068; H04B 7/04; H04B 15/00; H04L 5/0048
See application file for complete search history.

(56) References Cited

U.S. PATENT DOCUMENTS

2012/0182896 A1    7/2012  Jang et al.
2012/0195271 A1*   8/2012  Lee .......................... H04L 5/003
                                                     370/329

(Continued)

FOREIGN PATENT DOCUMENTS

WO    2011/145886 A2    11/2011
WO    2011/159072 A2    12/2011
WO    2012-124892 A1    9/2012

OTHER PUBLICATIONS

Samsung; Interference Measurement Resource for Downlink CoMP; 3GPP TSG RAN WG1 #69; R1-122236; May 21-25, 2012; Prague, Czech Republic.

(Continued)

*Primary Examiner* — Albert T Chou
(74) *Attorney, Agent, or Firm* — Jefferson IP Law, LLP

(57) ABSTRACT

A method and a device for measuring interference in a communication system are provided. The method includes measuring interference in a base station of a communication system, in which one or more antenna groups are arranged at different positions in a single cell, includes the steps of determining a reception antenna group which is one of the one or more antenna groups that transmits a signal other than an interference signal to a terminal, determining a reference signal in order to measure the strength of the signal trans- (Continued)

mitted by the reception antenna group, a step of determining a wireless resource so as to measure the interference in each of the one or more antenna groups, and notifying the terminal with the strength of the signal transmitted by the reception antenna group and information for measuring the interference in each of the one or more antenna groups.

20 Claims, 9 Drawing Sheets

(51) Int. Cl.
    *H04B 7/06*     (2006.01)
    *H04L 5/00*     (2006.01)
    *H04B 15/00*     (2006.01)
    *H04B 7/04*     (2006.01)
    *H04J 11/00*     (2006.01)
    *H04W 88/08*     (2009.01)

(52) U.S. Cl.
    CPC ........... *H04B 15/00* (2013.01); *H04J 11/0023* (2013.01); *H04L 5/0048* (2013.01); *H04W 88/085* (2013.01)

(56) References Cited

U.S. PATENT DOCUMENTS

| | | | |
|---|---|---|---|
| 2012/0213261 | A1 | 8/2012 | Sayana et al. |
| 2012/0327800 | A1* | 12/2012 | Kim .................... H04W 72/082 370/252 |
| 2013/0094384 | A1 | 4/2013 | Park et al. |
| 2013/0094547 | A1 | 4/2013 | Kang et al. |
| 2013/0343220 | A1 | 12/2013 | Chun et al. |
| 2014/0241200 | A1* | 8/2014 | Chun .................... H04L 5/0048 370/252 |
| 2014/0355469 | A1* | 12/2014 | Kang .................... H04J 11/005 370/252 |

OTHER PUBLICATIONS

Ericsson, St-Ericsson; CQI Definition of UE Emulated Intra CoMP Cluster Interference; 3GPP TSG-RAN WG1 #69; May 21-30, 2012; Prague, Czech Republic.

* cited by examiner

METHOD AND DEVICE FOR MEASURING INTERFERENCE IN COMMUNICATION SYSTEM

CROSS-REFERENCE TO RELATED APPLICATION(S)

This application is a U.S. National Stage application under 35 U.S.C. §371 of an International application filed on Nov. 1, 2013 and assigned application number PCT/KR2013/009856, which claimed the benefit of a Korean patent application filed on Nov. 2, 2012 in the Korean Intellectual Property office and assigned Serial No. 10-2012-0123768, and of a Korean patent application filed on Nov. 13, 2012 in the Korean Intellectual Property office and assigned Serial No. 10-2012-0128061, the entire disclosure of each of which is hereby incorporated by reference.

TECHNICAL FIELD

The present disclosure relates to a method and an apparatus for measuring interference in a communication system. More particularly, the present disclosure relates to a method and an apparatus for measuring the interference of downlink in a distributed antenna system.

BACKGROUND

A mobile communication system has been developed as a high-speed and high-quality wireless packet data communication system in order to provide data services and multimedia services as well as voice-based services. In recent years, a variety of mobile communication standards such as High Speed Downlink Packet Access (HSDPA), High Speed Uplink Packet Access (HSUPA), Long Term Evolution (LTE), and Long Term Evolution Advanced (LTE-A) of the 3rd Generation Partnership Project (3GPP), High Rate Packet Data (HRPD) of the 3GPP2, and Institute of Electrical and Electronics Engineers (IEEE) 802.16 have been developed to support a high-speed and high-quality wireless packet data transmission service. In particular, the LTE system is a system that has been developed to efficiently support high-speed wireless packet data transmission, and may maximize a capacity of a wireless system using a variety of wireless access technologies. In addition, an LTE-A system, which evolved from the LTE system, has an improved data transmission capability when compared to the LTE system.

In general, the LTE system refers to a base station and a terminal corresponding to Release 8 or 9 of the 3GPP standard group, and the LTE-A system refers to a base station and a terminal corresponding to Release 10 of the 3GPP standard group. In the 3GPP standard group, the standardization of the subsequent Release having improved performance based on the standardization of the LTE-A system is ongoing even after the standardization of the LTE-A system.

The 3G and 4G wireless packet data communication system such as HSDPA, HSUPA, HRPD, LTE/LTE-A, etc. may use techniques such as an Adaptive Modulation and Coding (hereinafter, referred to as "Adaptive Modulation and Coding (AMC)") method, a channel-sensitive scheduling method, and the like in order to improve the transmission efficiency. When using the AMC method, a transmitter may adjust an amount of data to be transmitted according to a channel status. By way of example, when the channel status is poor, the transmitter may adjust a reception error probability to a desired level by reducing the amount of data to be transmitted, and when the channel status is good, the transmitter may efficiently transmit a large amount of information while adjusting the reception error probability to the desired level by increasing the amount of data to be transmitted. When using a channel-sensitive scheduling resource management method, the transmitter may selectively serve a user having an excellent channel status among multiple users, and therefore the system capacity is increased when compared to allocating a channel to one user and serving the user. This capacity increase is often referred to as "Multi-user Diversity gain". The AMC method and the channel-sensitive scheduling method may receive feedbacks of partial channel status information from a receiver, and apply an appropriate modulation and coding scheme at the time that is determined to be the most efficient.

When used together with a Multiple Input Multiple Output (MIMO) transmission method, the AMC method may include a function of determining the number of spatial layers of signals to be transmitted or a rank thereof. In this case, the AMC method may consider the number of layers to which data is transmitted using MIMO, without simply considering only the coding rate and the modulation scheme in determining the optimum data rate.

In recent years, research has been actively conducted to switch Code Division Multiple Access (CDMA), i.e., a multiple access scheme that has been used in the 2G and 3G mobile communication systems, to Orthogonal Frequency Division Multiple Access (OFDMA) in the next-generation communication system, and, in 3GPP and 3GPP2, the standardization on the evolved systems that use OFDMA is ongoing. It is well known that OFDMA may contribute to an increase in capacity, when compared to CDMA. By way of example, OFDMA can perform frequency domain scheduling on a frequency axis to thereby increase the capacity. As the capacity gain was obtained by the channel-sensitive scheduling method based on the time-varying characteristics of channels, additional capacity gain can be obtained by utilizing the frequency-dependent characteristics of channels.

FIG. 1 is a diagram illustrating time and frequency resources which are used in an LTE/LTE-A system according to the related art.

Referring to FIG. 1, wireless resources, which are allocated to user equipment (UE) by an enhanced Node B (eNB), are divided in a resource block (RB) unit on a frequency axis, and in a subframe unit on a time axis. Generally, one RB includes 12 subcarriers in the LTE/LTE-A system, and occupies a band of 180 kHz. Generally, one subframe includes 14 OFDM symbol sections in the LTE/LET-A system, and occupies a time section of 1 msec. When performing scheduling, the LTE/LTE-A system may allocate resources in the subframe unit on the time axis, and in the RB unit on the frequency axis.

FIG. 2 is a diagram illustrating wireless resources of one subframe and one RB which is a minimum unit for downlink scheduling in an LTE/LTE-A system according to the related art.

Referring to FIG. 2, the wireless resources may be configured with one subframe on the time axis, and one RB on the frequency axis. In this instance, one RB is constituted of 12 subcarriers in a frequency domain, and one subframe is constituted of 14 OFDM symbols in a time domain, so that the wireless resources have a total of 168 unique frequencies and time positions. In LTE/LTE-A, each unique frequency and time position of FIG. 2 is called a resource element (RE).

A plurality of different kinds of signals can be transmitted to the wireless resources illustrated in FIG. 2.

1) Cell Specific Reference Signal (CRS): Reference signal transmitted for all UEs belonging to one cell.

2) Demodulation Reference Signal (DMRS): Reference signal transmitted for a specific UE.

3) Physical Downlink Shared Channel (PDSCH): Data channel transmitted by a downlink, used in order for an eNB to transmit traffic to a UE, and transmitted using an RE in which a reference signal is not transmitted in data region of FIG. 2.

4) Channel Status Information Reference Signal (CSI-RS): Reference signal transmitted for UEs belonging to one cell, and used to measure channel status. Here, a plurality of CSI-RSs can be transmitted to one cell.

5) Other control channels (PHICH, PCFICH, and PDCCH): Provide control information required for receiving PDSCH by UE, or transmitting Acknowledgement/Negative Acknowledgement (ACK/NACK) for operating hybrid automatic repeat request (HARQ) concerning uplink data transmission.

Other than the above-described signals, the LTE-A system may set muting so that a CSI-RS transmitted by another eNB can be transmitted to UEs of the corresponding cell without interference. Muting may be applied in a position in which the CSI-RS can be transmitted, and the UE may receive a traffic signal over the corresponding wireless resources. Due to characteristics of muting, muting may be applied in the position of the CSI-RS and transmission power may not be transmitted, and therefore muting in the LTE-A system may be also referred to as zero-power CSI-RS.

In FIG. 2, the CSI-RS may be transmitted using a part of positions indicated by A, B, C, D, E, E, F, G, H, I, and J depending on the number of remote radio heads (RRHs) that transmit the CSI-RS, and muting may be also applied to the part of the positions indicated by A, B, C, D, E, E, F, G, H, I, and J. In particular, the CSI-RS may be transmitted to 2, 4, and 8 REs depending on the number of CSI-RS ports that transmit the CSI-RS. When the number of CSI-RS ports is 2, the CSI-RS may be transmitted to half of a specific pattern in FIG. 2, when the number of CSI-RS ports is 4, the CSI-RS may be transmitted to the whole of the specific pattern, and when the number of CSI-RS ports is 8, the CSI-RS may be transmitted using two patterns. On the other hand, muting may be always performed in a unit of one pattern. That is, muting may be applied to a plurality of patterns, but may not be applied to only a part of one pattern when a position of muting is not overlapped with the position of the CSI-RS. However, only when the position of the CSI-RS and the position of muting are overlapped with each other, muting may be applied to only a part of one pattern.

In order to measure a downlink channel status in a cellular system, a reference signal should be transmitted. In the LTE-A system of 3GPP, a UE measures a channel status between an eNB and the UE using a CSI-RS transmitted by the eNB. For the channel status, several factors such as an amount of interference in a downlink may be basically considered. The amount of interference in the downlink may include interference signals, thermal noise, and the like generated by RRHs belonging to a neighboring eNB, and may be important when the UE determines the downlink channel status. By way of example, when an eNB with one transmission RRH transmits data to a UE with one reception RRH, the UE should decide energy per symbol to interference density ratio (Es/Io) by determining energy per symbol that can be received by a downlink and an amount of interference that can be simultaneously received in a section that receives the corresponding symbol, from the reference signal received from the eNB. The decided Es/Io may be notified to the eNB, and the eNB may decide a data transmission rate of the downlink that transmits data to the UE using the Es/Io.

In the case of a general mobile communication system, an eNB equipment is disposed in the midpoint of each cell, and the corresponding eNB equipment performs mobile communication with the UE using one or a plurality of RRHs as located in a limited position. A mobile communication system in which RRHs belonging to a single cell are arranged in the same location in this manner is referred to as a centralized antenna system (CAS). On the other hand, a mobile communication system in which RRHs belonging to a single cell are arranged in distributed locations within the cell is referred to as a distributed antenna system (DAS).

FIG. 3 is a diagram illustrating distributed locations of RRHs arranged in a general DAS according to the related art.

Referring to FIG. 3, a DAS includes two cells 300 and 310, and each of the cells 300 and 310 includes a single high-output RRH 320 and four low-output RRHs 340. In this instance, the high-output RRH 320 may provide minimal service throughout the entire region included in a cell region, and the low-output RRHs 340 may provide a high data rate-based service to limited UEs in a limited region within the cell. In addition, the low-output RRHs 340 and the high-output RRH 320 are all connected to a central controller (not illustrated) as shown by dotted lines 330, and thereby operated according to scheduling and wireless resource allocation of the central controller. In a single RRH location geographically separated from the DAS, one or a plurality of RRHs may be arranged. One or a plurality of RRHs arranged in the same location in the DAS may be referred to as an RRH group.

In the DAS shown in FIG. 3, a UE may receive signals from a single geographically separated RRH group, but signals transmitted from the remaining RRH groups may act as interference to the UE.

FIG. 4 is a diagram illustrating an interference phenomenon that occurs when data is transmitted to other UEs for each RRH group in a DAS according to the related art.

Referring to FIG. 4, a UE 1 (400), a UE 2 (420), a UE 3 (440), and a UE 4 (460) receive traffic signals from RRH groups 410, 430, 450, and 470, respectively. The UE 1 (400) may receive interference from other RRH groups that transmit the traffic signals to other UEs while receiving the traffic signals from the RRH group 410, and by way of example, in FIG. 4, signals transmitted from the RRH groups 430, 450, and 470 may generate an interference effect in the UE 1 (400).

In general, there are the following two kinds of interference that occur by another RRH group in a DAS.

1) Inter-cell interference: Interference that occurs in RRH group of other cell

2) Intra-cell interference: Interference that occurs in RRH group of the same cell In FIG. 4, as intra-cell interference to the UE 1 (400), there is interference that occurs in the RRH group 430 belonging to the same cell, and as inter-cell interference, there is interference that occurs in the RRH groups 450 and 470 of a neighboring cell. The inter-cell interference and intra-cell interference may be received simultaneously with data channel signals of a UE to disturb reception of the data channel signals of the UE.

In order for a UE of the DAS to receive signals at an optimum data transmission rate using a downlink, it is necessary to accurately measure inter-cell interference and intra-cell interference that cause interference to the UE itself, and request a data transmission rate from an eNB based on a compared result between the measured interference and the strength of the received signals.

In the case of a general CAS rather than the DAS, there is only one RRH group for each cell. In this case, intra-cell interference that occurs between other RRH groups within the same cell as shown in FIG. 4 does not occur, and only inter-cell interference that occurs in other cells occurs. When the LTE/LTE-A system is configured as a CAS, it is possible to measure inter-cell interference using the CRS described in FIG. 2. In general, in the CAS, a UE receives the CRS, and then converts the CRS having periodic characteristics in a frequency domain into a delay domain signal using Inverse Fast Fourier Transform (IFFT).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for measuring interference in a communication system.

Another aspect of the present disclosure is to provide a method and an apparatus for measuring downlink interference in a distributed antenna system (DAS).

Another aspect of the present disclosure is to provide a method and an apparatus for measuring downlink interference from a plurality of remote radio head (RRH) groups located in the same cell.

In accordance with an aspect of the present disclosure, a method for performing interference measurement in an enhanced Node B (eNB) of a communication system in which at least one RRH group is arranged in distributed locations within a single cell is provided. The method includes determining a reception RRH group that is an RRH group that transmits a signal other than an interference signal to a user equipment (UE) among the at least one RRH group, determining a reference signal for measuring a strength of the signal transmitted by the reception RRH group, determining a wireless resource for measuring interference for each of the at least one RRH group, and notifying the UE of the strength of the signal transmitted by the reception RRH group and information for interference measurement for each of the at least one RRH group.

In accordance with another aspect of the present disclosure, a method for performing interference measurement in a UE of a communication system in which at least one RRH group is arranged in distributed locations within a single cell is provided. The method includes receiving, from an eNB, a strength of a signal transmitted by a reception RRH group that transmits a signal other than an interference signal to the UE among the at least one RRH group and information for interference measurement for the at least one RRH group, measuring, when it is determined that a resource for interference measurement is allocated by checking the received information for interference measurement, interference using the allocated resource for interference measurement, receiving a reference signal from the reception RRH group, and generating channel status information using an amount of the measured interference, and transmitting the channel status information to the eNB.

In accordance with another aspect of the present disclosure, an eNB of a communication system in which at least one RRH group is arranged in distributed locations within a single cell is provided. The eNB includes a reception unit configured to receive a signal from a UE, a transmission unit configured to transmit a signal to the UE, and a control unit configured to determine a reception RRH group that is an RRH group that transmits a signal other than an interference signal to the UE among the at least one RRH group, to determine a reference signal for measuring a strength of the signal transmitted by the reception RRH group, to determine a wireless resource for measuring interference for each of the at least one RRH group, and to notify the UE of the strength of the signal transmitted by the reception RRH group and information for interference measurement for each of the at least one RRH group.

In accordance with another aspect of the present disclosure, a UE of a communication system in which at least one RRH group is arranged in distributed locations within a single cell is provided. The UE includes a reception unit configured to receive a signal from an eNB, a transmission unit configured to transmit the signal to the eNB, and a control unit configured to receive, from the eNB, a strength of a signal transmitted by a reception RRH group that transmits a signal other than an interference signal to the UE among the at least one RRH group and information for interference measurement for the at least one RRH group, to measure, when it is determined that a resource for interference measurement is allocated by checking the received information for interference measurement, interference using the allocated resource for interference measurement, to receive a reference signal from the reception RRH group and generate channel status information using an amount of the measured interference, and to transmit the channel status information to the eNB.

In a method and an apparatus for measuring interference in a communication system according to embodiments of the present disclosure, a UE) may measure interference that occurs in a other RRH group belonging to the same cell as well as interference that occurs in RRH groups of another cell, thereby calculating an accurate signal-to-interference ratio (SIR), and improving performance of the communication system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of embodiments of the present disclosure, descriptions will be made using an Orthogonal Frequency Division Multiple (OFDM)-based wireless communication system, especially, a 3rd Generation Partnership Project (3GPP) EUTRA standard as the main target. However, the subject matter of the present disclosure may be also applicable with some modifications to other communication systems having a similar technical background and channel type to the extent not departing significantly from the scope of the present disclosure, which will be determined by skilled persons with technical knowledge in the art.

Figure 5:
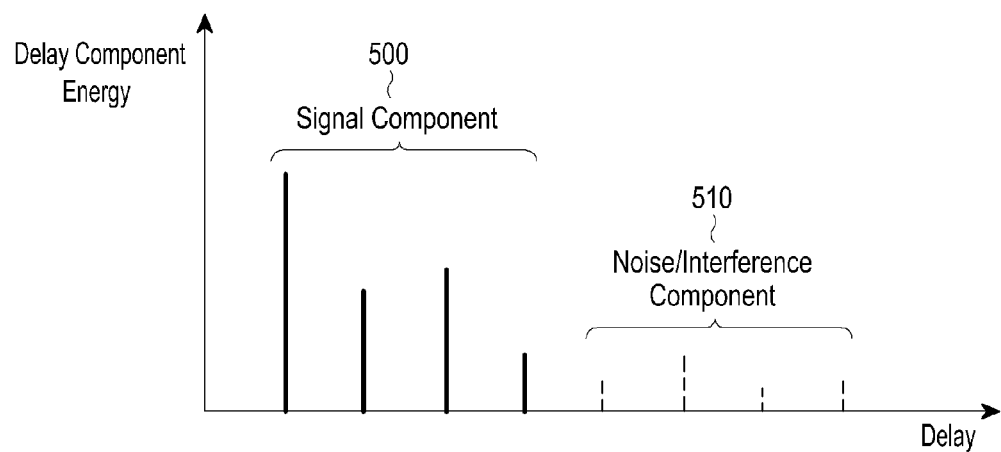
FIG. 5 is a diagram illustrating a state in which a Cell Specific Reference Signal (CRS) is converted into a delay domain signal according to an embodiment of the present disclosure.

FIG. 5 is a diagram illustrating a state in which a Cell Specific Reference Signal (CRS) is converted into a delay domain signal.

Referring to FIG. 5, in a Long Term Evolution/Long Term Evolution Advanced (LTE/LTE-A) system, when performing Inverse Fast Fourier Transform (IFFT) from a signal to a delay domain, it is possible to obtain a channel impulse response in which energy loaded on a delay component is likely to be reduced along with an increase in the delay. In general, a rear portion 510 in the signal obtained after performing IFFT as shown in FIG. 5 may correspond to interference that occurs in another cell, whereas a front portion 500 may correspond to an actual signal component of the CRS. In this case, the same CRS is not transmitted in other cells, and therefore a user equipment (UE) can calculate its own signal-to-noise ratio (SNR) by measuring the magnitude of interference located in the rear portion. The other cells may transmit the CRS using different frequency/time resources, and unique scrambling for each cell may be applied to the CRS. Therefore, the above-described interference measurement method is possible. In the case of the LTE/LTE-A system, scrambling of the CRS may be determined by a cell ID of the corresponding cell.

On the other hand, in a case of a distributed antenna system (DAS) in the LTE/LTE-A system, all remote radio head (RRH) groups existing in the same cell may transmit CRSs in the same location, and cannot apply unique scrambling for each RRH group to the CRS. In this manner, when the RRH groups belonging to the same cell cannot transmit the unique CRSs, an amount of inter-cell interference by RRH groups of a neighboring cell may be measured, but an amount of intra-cell interference by other RRH groups belonging to the same cell may not be measured.

When measuring an amount of interference using the method described in FIG. 5, a UE can measure only interference that occurs in RRH groups of another cell, and cannot measure interference that occurs in another RRH group belonging to the same cell, so that an inaccurate SIR may be obtained. Thus, the inaccurate SIR may cause a significant performance degradation of the LTE/LTE-A system in which a data transmission rate of a downlink is required to be adaptively changed using the SIR through Adaptive Modulation and Coding (AMC).

In addition, in a case in which a UE generates channel status information in a uniform method, by way of example, when the UE generates the channel status information based on only an amount of interference measured within a time section having the same size in performing interference measurement, this may cause maximization or reduction of the system performance according to a method in which the eNB is implemented. By way of example, when the UE generates channel status information by performing interference measurement in a time section of 5 ms rather than 1 ms and notifies the eNB of the generated channel status information, this may cause a performance degradation of the eNB. This is a case in which the eNB is implemented to use the channel status information generated in the time section of 1 ms, but when the UE uses the time section of 5 ms, interference measured in the time section of 2 to 5 ms may already be values of the past, and therefore the measured interference may make information within the time section of 1 ms required for the eNB incorrect. In contrast, when the UE generates channel status information by performing interference measurement in the time section of 1 ms and notifies the eNB of the generated channel status information, the notified information may be information of the time section required for the eNB, and therefore the eNB may respond in real-time to the channel status, thereby exhibiting optimum performance. Thus, when the UE performs interference measurement in a time section suitable for an implementation method of the eNB according to the implementation method, generated channel status information may be advantageous to increase the system performance.

In addition, in a cooperative communication system, the eNB should be accurately aware of which kind of interference the UE measured to generate specific channel status information. When aware of which kind of interference the UE measured, the eNB may accurately perform central control type interference management.

In the above-described interference measurement method, it has been discussed that a UE performs interference measurement by utilizing which kind of frequency resource. However, a method in which the UE measures interference in the subframe corresponding to a plurality of Interference measurement resources (IMRs) in time resources as well as frequency resources for the purpose of interference measurement, and then obtains average interference by statistically averaging the measured interference may be possible. In order to perform averaging in the time section in this manner, it is necessary to define the time section in which interference measurement is to be performed.

In order to determine an efficient data transmission rate of the downlink in a DAS, the UE should measure even intra-cell interference as well as inter-cell interference. For this, according to the present disclosure, the following two methods are proposed.

i) Method 1: Interference measurement method using CSI-RS
 ii) Method 2: Interference measurement method using muting <First Embodiment: Interference Measurement Method Utilizing CSI-RS>

An interference measurement method according to a first embodiment of the present disclosure may use Channel Status Information Reference Signal (CSI-RS).

When measuring interference using CSI-RS, a UE separately measures inter-cell interference and intra-cell interference, and then derives a total amount of interference by adding the two. In this instance, the inter-cell interference may be measured using a CRS as shown in FIG. 5. The interference measured using the CRS includes interference that occurs in RRH groups belonging to a neighboring cell, but does not include interference that occurs in RRH groups of a cell to which the UE belongs. Thus, an additional method that can measure intra-cell interference is required.

Figure 4:
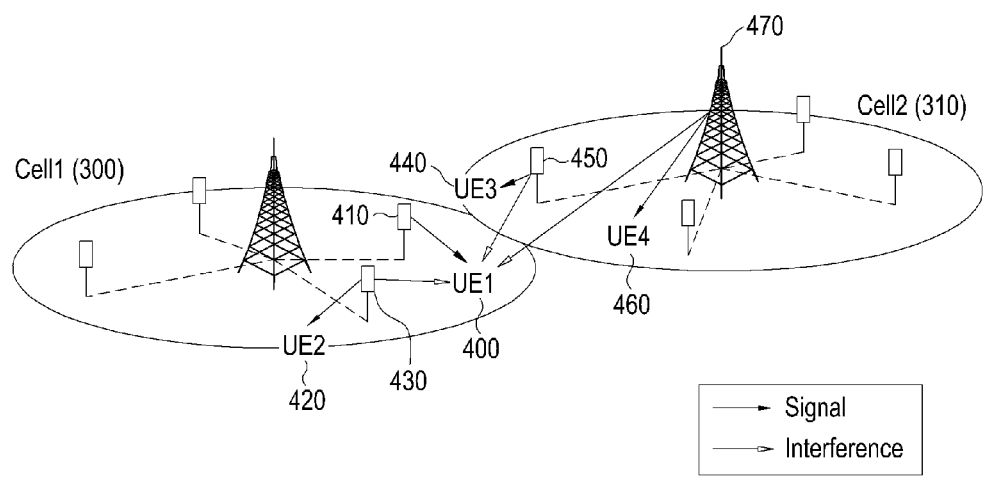
FIG. 4 is a diagram illustrating an interference phenomenon that occurs when data is transmitted to other user equipments (UEs) for each RRH group in a DAS according to the related art.

According to the first embodiment of the present disclosure, an eNB notifies a UE of an interference measurement set in order to measure the intra-cell interference. The interference measurement set is a set of RRH groups that cause interference to the UE in the cell to which the UE belongs. By way of example, in a case of FIG. 4, the UE may measure inter-cell interference using a CRS transmitted from a cell 2 (310), and measure intra-cell interference by receiving a CSI-RS transmitted from a cell 1 (300). For this, the eNB notifies the UE of an interference measurement set that is a set of RRH groups that cause intra-cell interference to the UE and information required for receiving the CSI-RS of the RRH groups included in the interference measurement set.

The interference measurement set transmitted from the eNB to the UE and the information required for receiving the CSI-RS of the RRH groups included in the interference measurement set may be notified to the UE using higher layer signaling. In addition, the higher layer signaling may be transmitted in such a manner as to be individually notified to each UE or simultaneously notified to a plurality of UEs. In Table 1, an example in which the interference measurement set and the information required for receiving CSI-RS of the RRH groups included in the interference measurement set are notified to the UE by the eNB so that the UE can efficiently measure the intra-cell interference is shown.

TABLE 1

| Reception RRH group | Interference measurement set | Information required for receiving CSI-RS of RRH group included in interference measurement set |
|---|---|---|
| RRH 1 | RRH 2, RRH 3, RRH 4 | CSI-RS related information transmitted from RRH 2, RRH 3, and RRH 4: transmission cycle, transmission position, the number of antenna ports, etc. |
|  | RRH 3, RRH 4 | CSI-RS related information transmitted from RRH 3, RRH 4: transmission cycle, transmission position, the number of antenna ports, etc. |
| RRH 2 | RRH 1, RRH 3, RRH 4 | CSI-RS related information transmitted from RRH 2, RRH 3, and RRH 4: transmission cycle, transmission position, the number of antenna ports, etc. |
|  | RRH 3, RRH 4 | CSI-RS related information transmitted from RRH 3, RRH 4: transmission cycle, transmission position, the number of antenna ports, etc. |

Interference Measurement-Related Information that is Notified to UE by eNB

In Table 1, the eNB may designate a plurality of reception RRH groups, and then notify the UE of an interference measurement set and related CSI-RS information (information required for receiving CSI-RS) for each reception RRH group. In this instance, the reason why the eNB designates the plurality of reception RRH groups is to enable the UE to select the best reception RRH group. In this manner, in order for the UE to select the best reception RRH group from the plurality of reception RRH groups, it is necessary to separately set an interference measurement set for each of the reception RRH groups.

From Table 1, it can be seen that two interference measurement sets are set in a case of a single reception RRH group. In this manner, the reason why a plurality of interference measurement sets are set is because the eNB may not perform transmission in a specific RRH group. In addition, the reason why the eNB does not perform transmission in the specific RRH group is to reduce an amount of interference that is caused by preventing transmission, or because there is no traffic data to be transmitted. By considering that there is a case in which an amount of interference does not exist at the time of a feedback operation of the CSI transmitted to the eNB by the UE, it is possible to improve the performance.

In Table 1, a reception RRH group 1 (RRH1) is set to measure interference while considering when an RRH group 2 (RRH2) is turned on and off. A plurality of wireless resources for measuring interference may be set for each reception RRH group, but only a single CSI-RS may be set for each reception RRH group.

From the information for interference measurement of Table 1, it can be seen that the reception RRH group is always excluded from the interference measurement set. This is because signals transmitted from the reception RRH group are useful signals with a data channel rather than interference.

Figure 6:
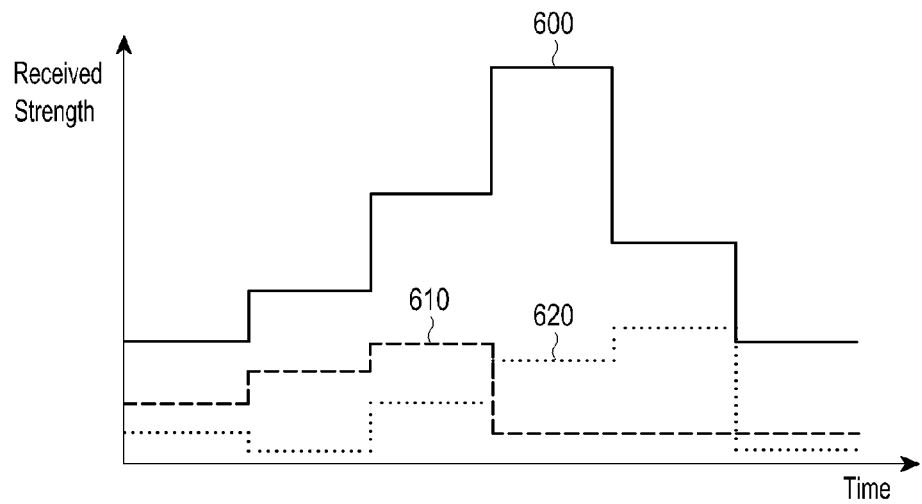
FIG. 6 is a diagram illustrating a method for measuring interference using a Channel Status Information Reference Signal (CSI-RS) according to an embodiment of the present disclosure.

FIG. 6 is a diagram illustrating a method for measuring interference using CSI-RS according to an embodiment of the present disclosure.

Referring to FIG. 6, a reference numeral 600 is a reception strength of a CSI-RS when a UE receives the CSI-RS transmitted from a reception RRH group, a reference numeral 610 is a reception strength of a CSI-RS transmitted from an RRH group included in an interference measurement set, and a reference numeral 620 is a reception strength of a CSI-RS transmitted from another RRH group included in the interference measurement set. The UE may determine a degree of intra-cell interference by receiving the CSI-RSs transmitted from the RRH groups included in the interference measurement set, and determine a total amount of interference by combining the determined degree of intra-cell interference and a degree of inter-cell interference determined using a CRS. The UE determines its own SNR using the determined total amount of interference and the reception strength 600 of the CSI-RS transmitted from the reception RRH group, and notifies the eNB of the determined SNR.

It has been described so far that the interference measurement set is used only to measure intra-cell interference, but it may be used to measure inter-cell interference. In this case, RRH groups included in another cell may be included in the interference measurement set transmitted to the UE by the eNB and the related CSI-RS information, but when this is applied to other cells, there is a problem in that an amount of information to be transmitted through higher layer signaling may be excessively increased.

<Second Embodiment: Interference Measurement Method Using Muting>

An interference measurement method using muting according to a second embodiment of the present disclosure will be herein described.

According to the second embodiment of the present disclosure, an eNB may notify a UE of resources that can directly measure interference. Here, a specific portion among frequency and time resources transmitted from each RRH group may be allocated as an IMR, and a reception RRH group does not perform transmission in the corresponding IMR, so that the UE can measure only the interference.

Figure 7:
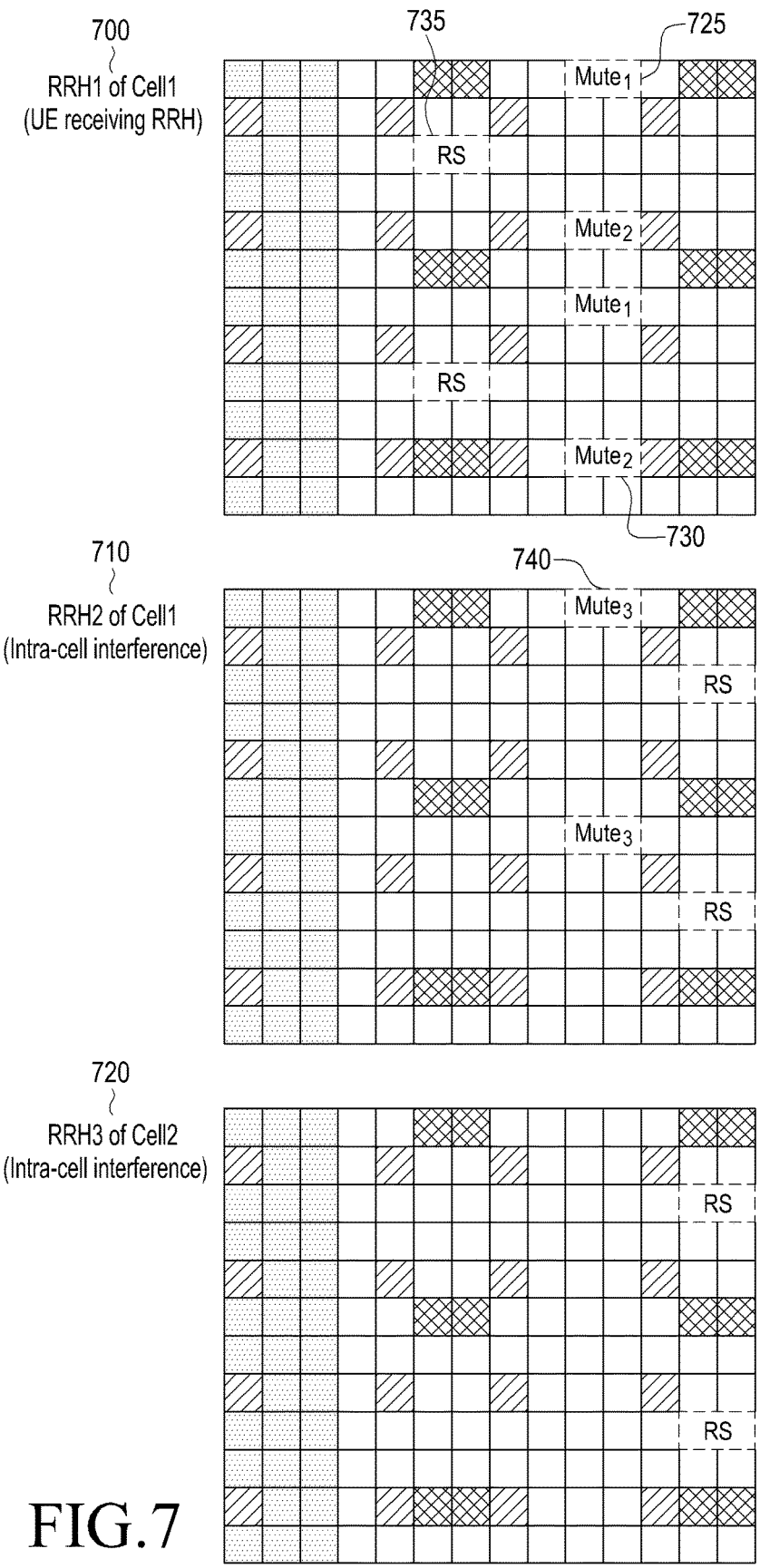
FIG. 7 is a diagram illustrating a method for measuring interference according to an embodiment of the present disclosure.

FIG. 7 is a diagram illustrating a method for measuring interference according to an embodiment of the present disclosure. In FIG. 7, signals transmitted from three RRH groups are shown.

Referring to FIG. 7, a reference numeral 700 is a signal transmitted from an RRH group (RRH 1) included in a cell 1, and the RRH group (RRH 1) corresponds to a reception RRH group of a UE. In addition, a reference numeral 710 is a signal transmitted from another RRH group (RRH 2) from the reception RRH group (RRH 1) of the UE, which is included in the same cell as that of the reception RRH group, and a reference numeral 720 is a signal transmitted from an RRH group (RRH 3) included in another cell from the cell of the reception RRH group.

Figure 1:
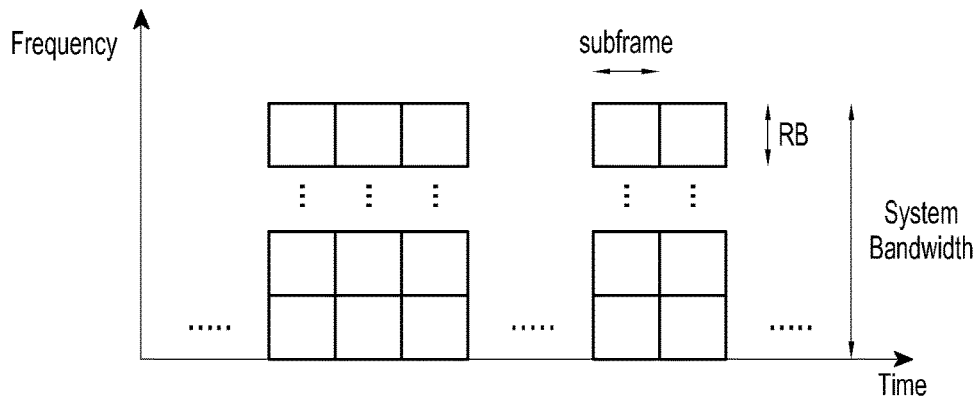
FIG. 1 is a diagram illustrating time and frequency resources which are used in an Long Term Evolution/Long Term Evolution Advanced (LTE/LTE-A) system according to the related art.
Figure 2:
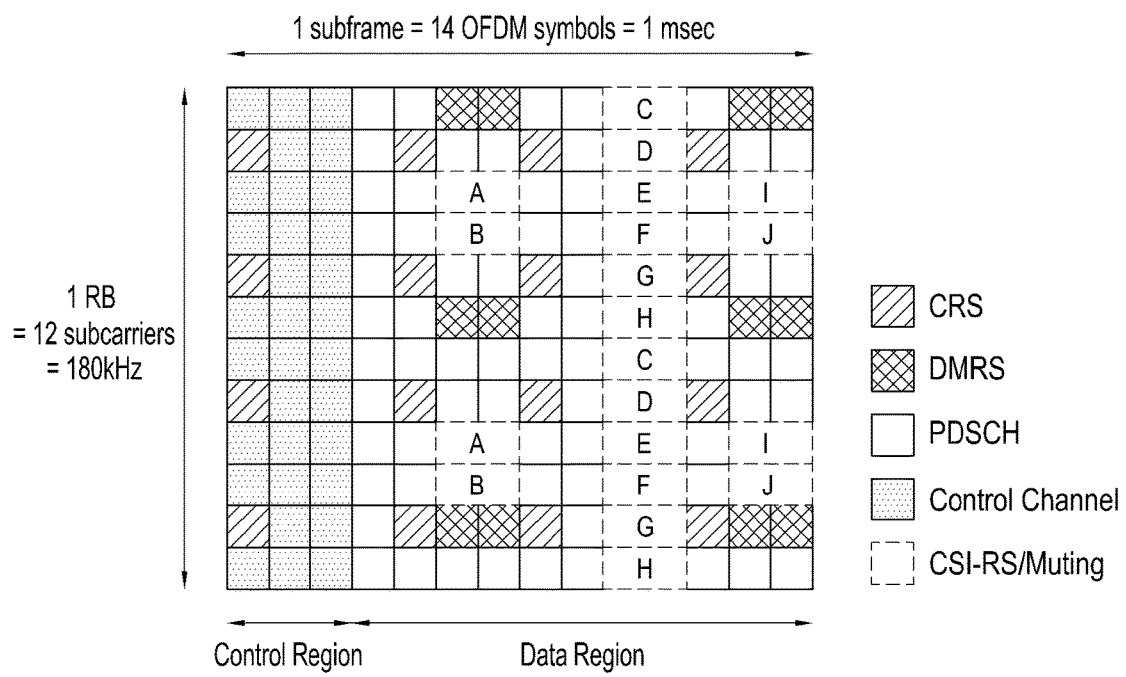
FIG. 2 is a diagram illustrating wireless resources of one subframe and one resource block (RB) which is a minimum unit for downlink scheduling in an LTE/LTE-A system according to the related art.
Figure 3:
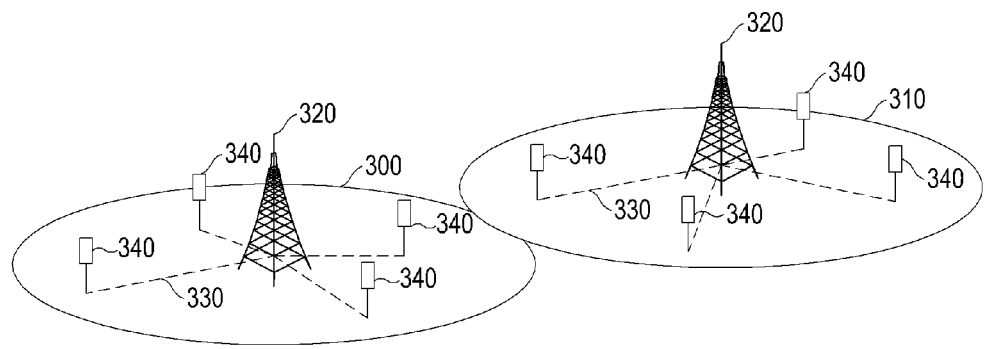
FIG. 3 is a diagram illustrating distributed locations of remote radio heads (RRHs) arranged in a general distributed antenna system (DAS) according to the related art.

An eNB allocates, to a UE having the RRH 1 as the reception RRH group, wireless resources corresponding to muting patterns C and G of FIG. 2 in order to measure interference, and a wireless resource 725 indicated by 'mute 1' and a wireless resource 730 indicated by 'mute 2' correspond to the wireless resources.

The UE may measure interference occurring in the RRH 2 which acts as intra-cell interference and interference occurring in the RRH 3 which acts as inter-cell interference, using the wireless resource 730 indicated by 'mute 2'. The reason why the UE measures the interference occurring in the RRH 2 and the RRH 3 using the wireless resource 730 indicated by 'mute 2' is because muting is not applied to the RRH 2 and the RRH 3 in the same frequency and time resources, and transmission of the signal of a traffic channel is performed. That is, the UE may measure the strength of a reception signal for its reception antenna group in a portion 735 indicated by 'RS', but measure an amount of interference in the wireless resource 730. In this instance, the reception RRH group (RRH 1) does not transmit any signals in the wireless resource 730 so that the UE can measure an accurate amount of interference.

In a case of the RRH 2 in a predetermined time section, muting may be applied in a wireless resource 740 indicated by 'mute 3'. But in a case of the RRH 3, the UE may measure only interference that occurs in the RRH 3 in a position of the wireless resource 720 because the signal of the traffic channel is transmitted.

According to the second embodiment of the present disclosure, the eNB notifies the UE of an interference measurement set in order to measure interference. In the first embodiment of the present disclosure, the interference measurement set may be mainly used to measure intra-cell interference, but in the second embodiment of the present disclosure, inter-cell interference and intra-cell interference may be selectively measured according to determination of the eNB. In addition, only the wireless resource to be measured may be notified without having to notify information for each RRH group that causes interference, and therefore even the amount of information that is transmitted through higher layer signaling may be reduced. Hereinafter, a zero-power CSI-RS or muting that is used to measure interference is referred to as an IMR.

In the second embodiment of the present disclosure, interference measurement set information transmitted to the UE from the eNB may be notified to the UE using higher layer signaling. In addition, the higher layer signaling may be transmitted in such a manner as to be individually notified to each UE or simultaneously notified to a plurality of UEs. In Table 2, according to the second embodiment of the present disclosure, interference measurement-related information that is notified to the UE by the eNB is shown.

TABLE 2

| Reception RRH group | Interference Measurement Set |
|---|---|
| RRH 1 | Muting Pattern C |
|  | Muting Pattern G |
| RRH 2 | Muting Pattern E |
|  | Muting Pattern B |

Interference Measurement-Related Information that is Notified to UE by eNB

In comparing Table 1 and Table 2, it can be seen that information required for receiving a CSI-RS of a specific RRH so as to measure interference is not required in the UE. In addition, when measuring interference, it is possible to simultaneously measure inter-cell interference while measuring intra-cell interference according to determination of the eNB without having to separately measure the inter-cell interference as shown in the first embodiment of the present disclosure.

From Table 2, it can be seen that two interference measurement sets are set for each single reception RRH group as shown in Table 1. In this manner, the reason why a plurality of interference measurement wireless resources are designated is to enable the UE to determine an efficient data transmission rate by individually performing interference measurement with respect to cases of performing and not performing transmission in the specific RRH group as described above and notifying the eNB of this. A plurality of wireless resources for measuring interference may be set for each reception RRH group, but only a single CSI-RS may be set for each reception RRH group.

Meanwhile, it should be noted that a signal transmitted from the corresponding reception RRH group should not be measured while measuring interference when determining the interference measurement set. For this, according to the present disclosure, the following method may be considered.

First, the eNB prevents a position of the CSI-RS transmitted from the reception RRH group and a position of muting designated by the interference measurement set from being overlapped with each other, when determining the interference measurement set.

Meanwhile, when interference measurement-related information that is set in such a manner that the position of muting designated by the interference measurement set and the position of the CSI-RS are partially overlapped with each other is notified to the UE by the eNB, the UE may measure interference using only the wireless resource of a position that is not overlapped with the CSI-RS out of the position of muting designated to measure interference, assuming that the CSI-RS may be transmitted in the position in which the CSI-RS and muting are overlapped with each other.

When information indicating that the interference measurement wireless resource and the CSI-RS transmission wireless resource of the reception RRH group are partially overlapped with each other is notified to the UE, the UE may set a priority in the CSI-RS without a separate additional notification, and measure interference only in the interference measurement wireless resource that is not overlapped with the CSI-RS.

When information indicating that the interference measurement wireless resource and the CSI-RS transmission wireless resource of the reception RRH group are partially overlapped with each other is notified to the UE, the UE may perform interference measurement only in a resource element (RE) in which the interference measurement wireless resource and the CSI-RS transmission wireless resource are not overlapped with each other, and also perform interference measurement only in a subframe in which the interference measurement wireless resource and the CSI-RS transmission wireless resource are not overlapped with each other. When performing interference measurement only in the RE in which the IMR and the CSI-RS are not overlapped with each other, the UE may measure interference only in the RE in which the IMR and the CSI-RS are not overlapped with each other among REs allocated to the CSI-RS and REs allocated to the IMR for interference measurement. When performing interference measurement only in the subframe in which the IMR and the CSI-RS are not overlapped with each other, the UE may perform interference measurement only in the IMR of the subframe that is not even partially overlapped with the CSI-RS among IMRs periodically generated in a time section.

Figure 14:
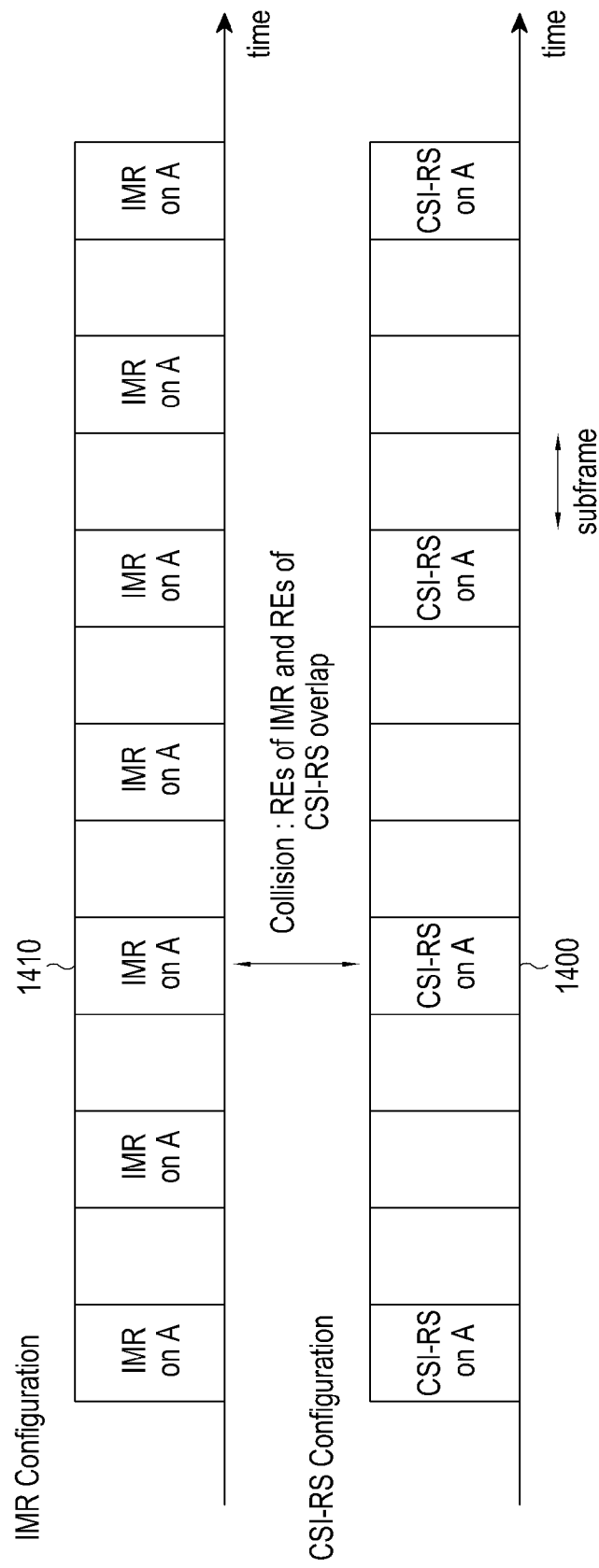
FIG. 14 is a diagram illustrating attention points when measuring interference in determining an interference measurement set according to an embodiment of the present disclosure.

By way of example, when a CSI-RS 1400 and an IMR 1410 are set as shown in FIG. 14, the UE may perform interference measurement only in the time section in which the IMR and the CSI-RS are not overlapped with each other. In FIG. 14, both the CSI-RS and the IMR are set to be generated in a position A among the positions of the REs of FIG. 2, so that the CSI-RS and the IMR are overlapped with each other every 4 ms. Here, when the CSI-RS and the IMR are overlapped with each other in at least one RE in this manner, the UE may perform interference measurement only in the subframe in which the CSI-RS and the IMR are not overlapped with each other, rather than performing interference measurement in the corresponding subframe.

The wireless resource for the CSI-RS set in the UE and the wireless resource used as the IMR (wireless resource for interference measurement) may be overlapped with each other. In this case, the UE may perform interference measurement only in the wireless resource in which the CSI-RS and the IMR are not overlapped with each other, or determine to perform interference measurement based on a Channel State Information (CSI) process to which the overlapped CSI-RS and IMR belong. The CSI process corresponds to a single CSI-RS for measuring a channel and a single IMR for measuring interference. In Table 2, the CSI-RS allocated to the RRH 1 and a specific muting pattern for interference measurement correspond to a single CSI process, and in a case of Table 2, a total of four CSI processes may exist.

A method of determining whether to perform interference measurement based on the CSI process is as follows.

First, a UE may determine whether the IMR and the CSI-RS are overlapped with each other in at least one RE, and when the IMR and the CSI-RS are overlapped with each other in the at least one RE, the UE may determine whether the corresponding IMR and CSI-RS belong to the same CSI process. In this instance, when the IMR and the CSI-RS belong to the same CSI process, the UE does not perform interference measurement in the corresponding subframe, and when the CSI-RS and the IMR overlapped with each other in the at least one RE belong to different CSI processes from each other, the UE may perform interference measurement in the corresponding subframe.

In order to describe a method of determining whether interference measurement is performed based on the CSI process, the following examples will be discussed.

i) CSI process 1: CSI-RS_A, IMR_B
ii) CSI process 2: CSI-RS_C, IMR_B
iii) CSI process 3: CSI-RS_C, IMR_D It is assumed that a UE is to perform interference measurement for a CSI process 1 in a specific subframe. In this instance, the UE should perform interference measurement using an IMR-B, but when the corresponding IMR is overlapped with a CSI-RS_A belonging to the same CSI process, the UE does not perform interference measurement in an IMR of the corresponding subframe. On the other hand, when the IMR_B is overlapped with a CSI-RS_C belonging to a CSI process 2 in the same subframe, the UE performs interference measurement in the IMR of the corresponding subframe.

To summarize the method of determining whether interference measurement is performed based on the CSI process, the UE does not perform interference measurement in the corresponding subframe when the CSI-RS belonging to the same CSI process and the IMR are overlapped with each other in performing interference measurement using the IMR, and performs interference measurement with respect to a specific CSI process only in the subframe in which the CSI-RS belonging to the corresponding CSI process and the IMR are not overlapped with each other.

However, when determining whether interference measurement is performed in the IMR based on the CSI process in this manner, a situation in which the UE can measure interference using the IMR in no subframe depending on how the IMR and the CSI-RS were set may occur. In this case, the UE may perform interference measurement using the CRS as described above, instead of measuring interference using the IMR, or generate channel status information using the latest interference measurement result.

In order to determine whether to perform interference measurement using the IMR based on the CSI process, a method of considering to which CSI process each of the IMR and the CSI-RS belongs is required, but additional implementation complexity is required in order to consider to which CSI process each of the IMR and the CSI-RS belongs.

Thus, a method of preventing the additional implementation complexity is required, and by way of example, a method of determining whether to perform interference measurement using the IMR only by considering whether the CSI-RS and the IMR are overlapped with each other in the at least one RE, without considering to which CSI process each of the IMR and the CSI-RS belongs may be used. That is, when the IMR set by an eNB and the CSI-RS are overlapped with each other in the at least one RE of the same subframe, the UE may not perform interference measurement using the IMR in the corresponding subframe. In this instance, the UE may perform this determination, regardless of whether the overlapped IMR and CSI-RS belong to the same CSI process, and when the IMR and the CSI-RS are overlapped with each other in the at least one RE of the same subframe, the UE may perform interference measurement using a CRS, instead of not performing interference measurement using the IMR in the corresponding subframe, or generate the CSI using the most recently obtained interference measurement value.

According to the first and second embodiments of the present disclosure, the inter-cell interference and the intra-cell interference may be measured in the DAS. In the DAS according to the first and second embodiments of the present disclosure, the interference measurement set and the related information may not be notified to the UE. That is, separate wireless resources for interference measurement may not be allocated to the UE.

When the required related information is not notified to the UE in the DAS according to the present disclosure, the UE may determine that the intra-cell interference is absent, and measure interference using only the CRS as shown in FIG. 5. The reason why the UE measures interference only using the CRS when the interference measurement set is not set is because the UE determines that the corresponding system is not configured in the form of a DAS based on the fact that a separate interference measurement set is not notified by the eNB. Thus, when the interference measurement set is not set by the DAS, the intra-cell interference does not occur in other RRH groups, and therefore it is sufficient to measure only the inter-cell interference only using the CRS. Operations related to setting of the interference measurement set will be summarized as follows.

i) A case in which interference measurement set is set: the UE may measure interference by applying the first and second embodiments of the present disclosure, and when using the first embodiment of the present disclosure, the inter-cell interference may be measured using the CRS.

2) A case in which interference measurement set is not set: the UE may measure only the inter-cell interference using the CRS.

Figure 8:
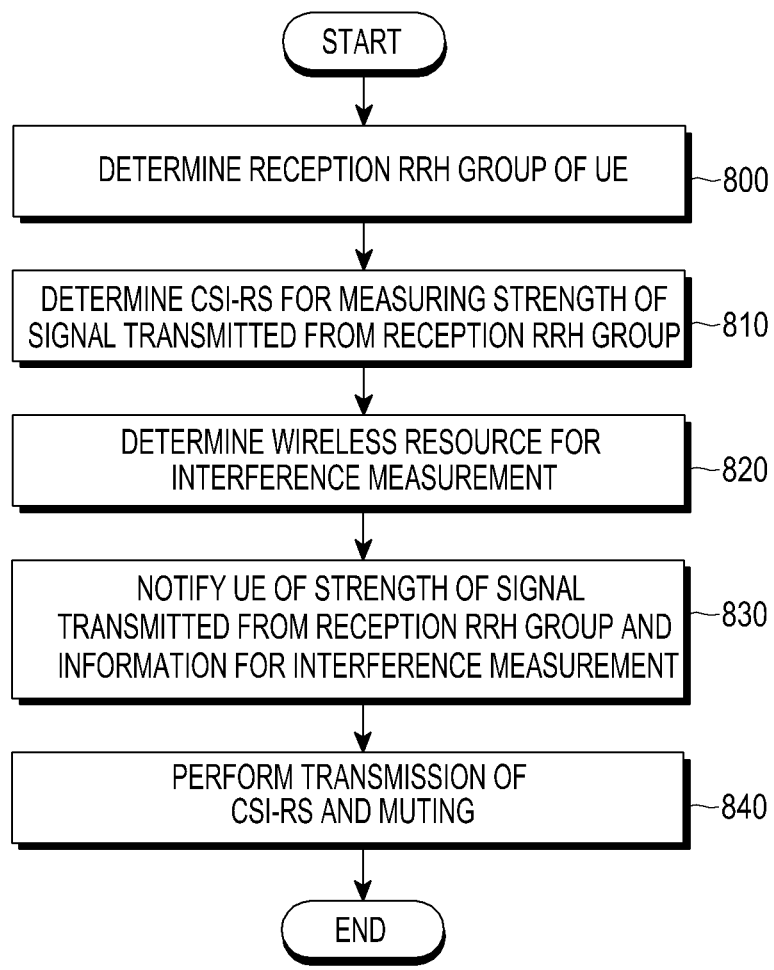
FIG. 8 is a flowchart illustrating operations of an enhanced Node B (eNB) of a DAS according to an embodiment of the present disclosure.

FIG. 8 is a flowchart illustrating operations of an eNB of a DAS according to an embodiment of the present disclosure.

Referring to FIG. 8, in operation 800, the eNB determines a reception RRH group.

In this instance, one or a plurality of reception RRH groups may be determined. In operation 810, the eNB that has determined the reception RRH group determines a CSI-RS for measuring the strength of a signal transmitted from the corresponding reception RRH group.

In this instance, a single CSI-RS may be determined for each of the determined reception RRH groups. In operation 820, the eNB determines wireless resources that can measure interference for each reception RRH group in order to measure interference. The wireless resources that can measure interference may be the CSI-RS transmitted from a neighboring RRH group, or a specific muting pattern.

In operation 830, the eNB notifies a UE of the strength of the signal transmitted from the determined reception RRH group and channel status information feedback-related information related to information for interference measurement. In this instance, higher layer signaling may be used. In operation 840, the eNB performs transmission of the CSI-RS or muting as notified to the UE.

Figure 9:
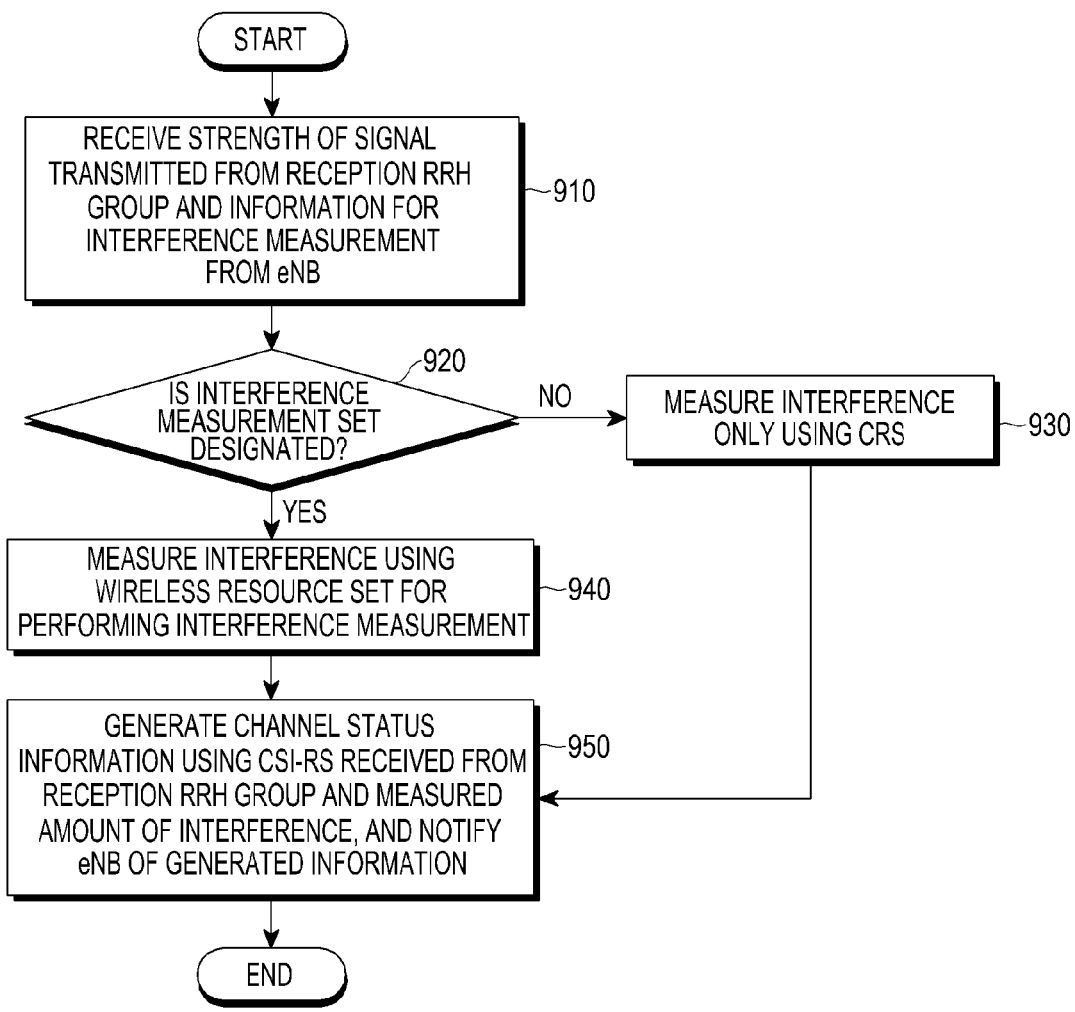
FIG. 9 is a flowchart illustrating operations of a UE of a DAS according to an embodiment of the present disclosure.

FIG. 9 is a flowchart illustrating operations of a UE of a DAS according to an embodiment of the present disclosure.

Referring to FIG. 9, in operation 910, a UE receives, from the eNB, the strength of the signal transmitted from the reception RRH group and the information for interference measurement. In this instance, the received information may include a CSI-RS measurement set, an interference measurement set, and channel status information feedback-related information, and may be obtained using higher layer signaling.

In operation 920, the UE determines whether the interference measurement set is allocated by checking the received information.

In operation 930, when the interference measurement set is not allocated (NO of operation 920), the UE measures interference only using a CRS.

On the other hand, in operation 940, when the interference measurement set is allocated (YES of operation 920), the UE measures interference using wireless resources set to perform interference measurement.

In this instance, the wireless resources set to perform interference measurement may be a CSI-RS allocated to a neighboring RRH group or a muting pattern. In operation 950, the UE that has measured interference generates channel status information using the CSI-RS received from the reception RRH group and the measured amount of interference, and notifies the eNB of the generated channel status information.

Figure 10:
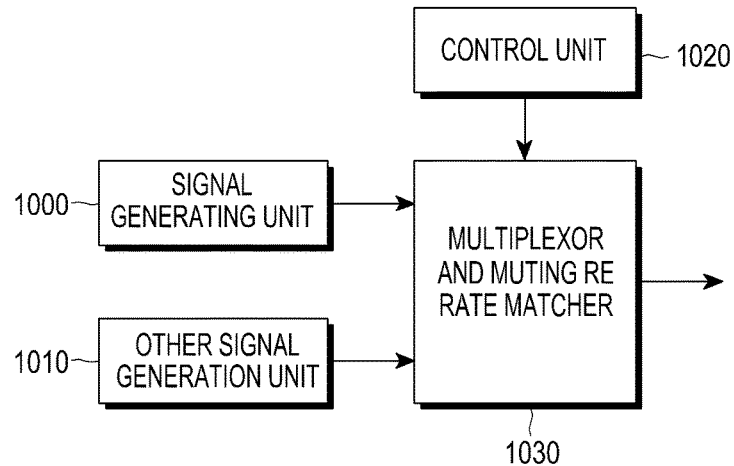
FIG. 10 is a diagram illustrating a configuration of an eNB of a DAS according to an embodiment of the present disclosure.

FIG. 10 is a diagram illustrating a configuration of an eNB of a DAS according to an embodiment of the present disclosure.

Referring to FIG. 10, the eNB may include a reception unit (not shown) that receives a signal, a transmission unit (not shown) that transmits a signal, and a control unit 1020. In addition, the eNB may further include at least one of a CRS-RS generation unit 1000, another signal generation unit 1010, and a multiplexor and muting RE rate matcher 1030.

The CSI-RS generation unit 1000 generates a CSI-RS for measuring a strength of a reception signal for each of distributed RRH groups, and the other signal generation unit 1010 generates different signals other than the CSI-RS. In addition, the multiplexor and muting RE rate matcher 1030 multiplexes the generated CSI-RS and the other signals together and transmits the multiplexed signals. The control unit 1020 may control the CSI-RS generation unit 1000 so as to generate the CSI-RS, and control overall operations of the eNB such as allocating the generated CSI-RS for each RRH group, and the like.

Figure 11:
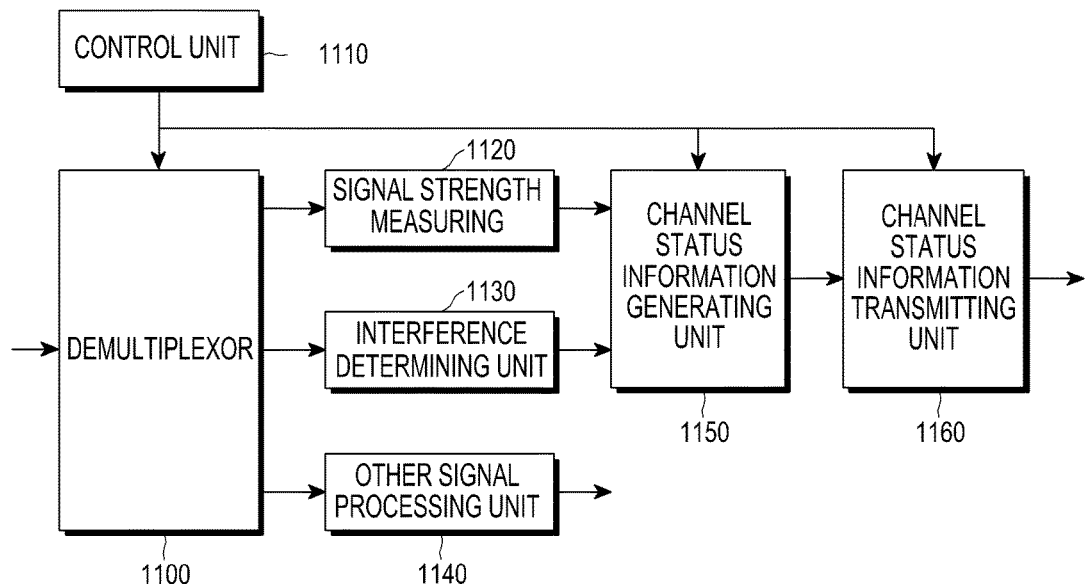
FIG. 11 is a diagram illustrating a configuration of a UE of a DAS according to an embodiment of the present disclosure.

FIG. 11 is a diagram illustrating a configuration of a UE of a DAS according to an embodiment of the present disclosure.

Referring to FIG. 11, the UE may include a reception unit (not shown) that receives a signal and a control unit 1110. The UE may further include at least one of a demultiplexor 1100, a signal strength measuring unit 1120, an interference determining unit 1130, another signal processing unit 1140, a channel status information generating unit 1150, and a channel status information transmitting unit 1160.

The demultiplexor 1100 may separate the signal received from the reception unit into a CSI-RS transmitted from a reception RRH group, an interference measurement signal, or other signals. The signal strength measuring unit 1120 measures the strength of a reception signal by receiving the CSI-RS transmitted from the reception RRH group. The other signal processing unit 1140 performs a predetermined process by receiving different signals other than the CSI-RS.

The interference determining unit 1130 determines the magnitude and characteristics of interference by receiving the interference measurement signal, and the channel status information generating unit 1150 generates channel status information to be transmitted to the eNB based on feedback-related information that has been notified by the eNB, by receiving the strength of the reception signal and interference-related information. The channel status information transmitting unit 1160 receives the generated channel status information and transmits the received information to the eNB. The control unit 1110 controls overall operations of the UE such as controlling the demultiplexor 1100 so that the signal received by the reception unit can be separated into the CSI-RS transmitted from the reception RRH group, the interference measurement signal, or other signals, and the like.

<Third Embodiment: Method of Notifying UE of Time Section for Interference Measurement Using Higher Layer Signaling>

An interference measurement method according to a third embodiment of the present disclosure may use higher layer signaling received from an eNB, and in this case, each eNB notifies a UE of a time section of resources used for measuring interference. That is, each eNB may use a size of the time section for interference measurement as an optimum value suitable for implementation of each eNB itself, and notifies the UE of the size of the time section using higher layer signaling. Next, the UE, to which the size of the time section for interference measurement has been notified by the eNB, may process interference signal measurement of the time section specified in the higher layer signaling in a statistical averaging method to estimate the strength of the interference signal and calculate the channel status information. In this instance, the time section may be defined by a subframe unit or the number of IMRs.

By way of example, when N IMR subframes are notified to the UE by the eNB, as the time section for measuring the interference signal, the UE performs interference measurement using IMRs included in the N subframes, and calculates the channel status information based on this. Unlike this, when the eNB defines the N IMRs as the time section and notifies the UE of the defined information, the UE measures and averages the interference signals in the N IMRs which are present before reporting the channel status information, and generates the channel status information based on this.

Figure 12:
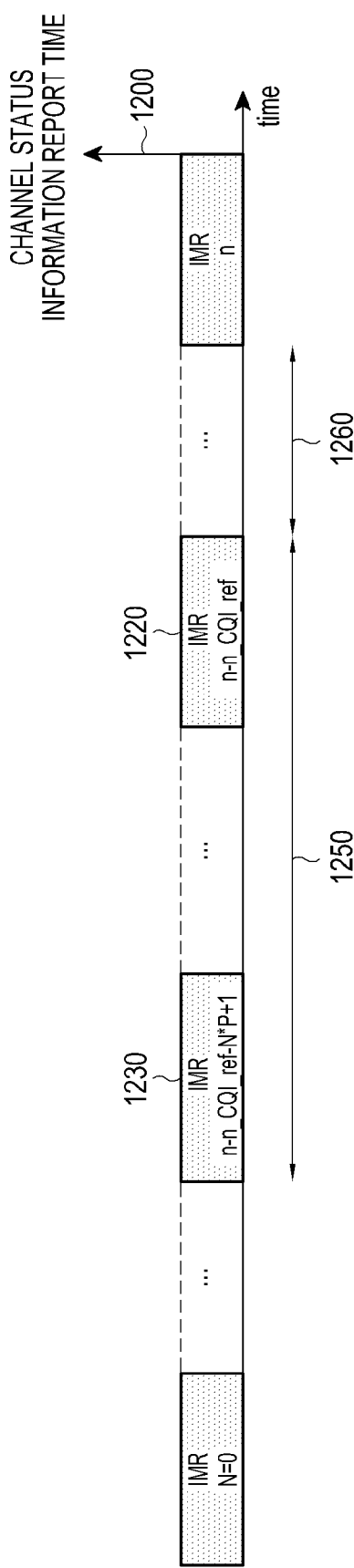
FIG. 12 is a diagram illustrating an example in which an eNB according to an embodiment of the present disclosure defines N Interference Measurement Resource (IMR) subframes as a time section to notify a UE of the defined IMR subframes.

FIG. 12 is a diagram illustrating an example in which an eNB according to an embodiment of the present disclosure defines N IMR subframes as a time section to notify a UE of the defined IMR subframes.

Referring to FIG. 12, IMRs are included in a received subframe, and are allocated at an interval of a cycle P. When it is assumed that a UE reports channel status information to an eNB in an n-th IMR subframe at a point of time 1200, a time section may be a time section 1250 reaching from a subframe 1220 prior to n_CQI_ref 1260 promised by the eNB and the UE to a subframe 1230 in which N IMR subframes are present. Next, the UE may calculate interference signals within the corresponding time section in a statistical averaging method, using the N IMR subframes prior to an n_CQI_ref-th subframe. Here, the time section at this time may be [n−n_CQI_ref−P*N+1, n−n_CQI_ref].

Figure 13:
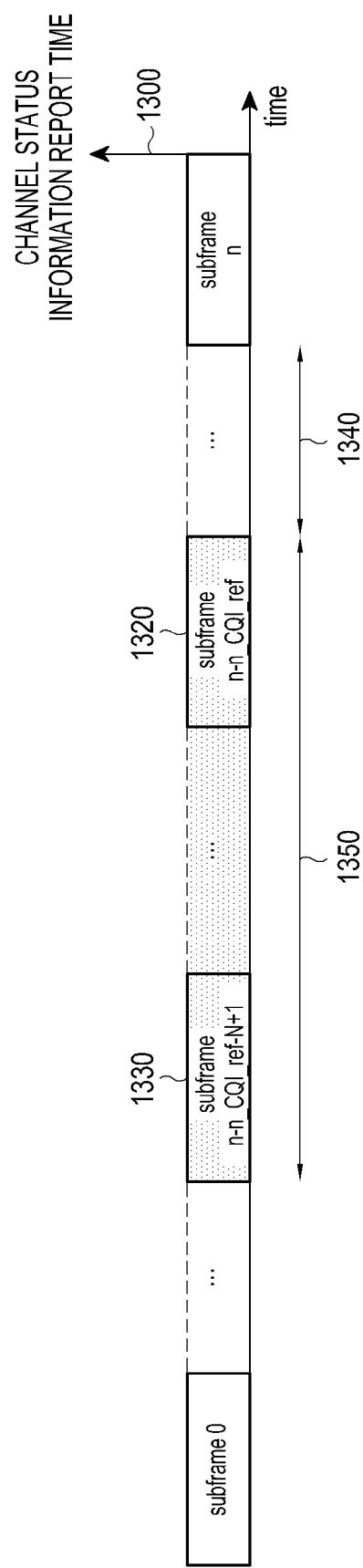
FIG. 13 is a diagram illustrating an example in which an eNB according to an embodiment of the present disclosure notifies a UE of N subframes in a time section.

FIG. 13 is a diagram illustrating an example in which an eNB according to an embodiment of the present disclosure notifies a UE of N subframes in a time section.

Referring to FIG. 13, in a similar manner to that in FIG. 12, IMRs are included in each subframe at an interval of a cycle P, and an eNB notifies a UE of N subframes in a time section. If it is assumed that the UE reports channel status information to the eNB in an n-th subframe at a point of time 1300, the UE may set a time section reaching from a subframe 1320 prior to n_CQI_ref 1340 promised with the eNB to a subframe 1330 in which the N subframes ends as a time section 1350, calculate the strength of the interference signals with a stochastic averaging method, using IMRs which are present within the N subframes, and generate the channel status information based on the calculated strength of the interference signals. In this instance, the time section may be [n−n_CQI_ref−N+1, n−n_CQI_ref].

In LTE, a plurality of subframe subsets have been introduced to consider a plurality of interference situations when transmitting channel status information about a single eNB. The subframe subsets are obtained by dividing a time section into a plurality of sections, and a UE generates channel status information about each subframe subset only by considering a CSI-RS or an IMR in the corresponding time section. By way of example, when it is assumed that a subframe that is present in a subframe subset 2 reports channel status information to the eNB and the time section at this time invades an area of a subframe subset 1, the UE may measure interference signals by considering only a CSI-RS or an IMR which is present in the subframe subset 2, and generate channel status information.

<Fourth Embodiment: Method in which UE Determines Time Section for Interference Measurement Using Other Setting Information>

In a fourth embodiment of the present disclosure, when an eNB does not notify a UE of a size of a time section using higher layer signaling, the UE may assume a default value set in advance, and perform interference measurement. When determining the size of the time section using other setting information, the UE does not have to receive separate higher layer signaling from the eNB. This is because the UE can determine the size of the time section in which interference measurement is performed, even using other setting information notified by the eNB. However, the above-described method should be a method that is determined in advance between the eNB and the UE, and according to the present disclosure, the following two pieces of information may be considered as setting information that is used when the UE performs interference measurement.

i) CSI-RS transmission cycle: P_RS
ii) CSI report cycle: P_CSI

The UE may determine the size of the time section for interference measurement using at least one of the two pieces of information, and by way of example, the UE may determine n times the P_RS as the size of the time section for interference measurement.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for performing interference measurement in an enhanced Node B (eNB) of a communication system in which at least one remote radio head (RRH) group is arranged in distributed locations within a single cell, the method comprising:
determining a reception RRH group for transmitting a signal other than an interference signal to a user equipment (UE) among the at least one RRH group;
determining a reference signal for measuring a strength of the signal transmitted by the reception RRH group;
determining a wireless resource for measuring interference for each of the at least one RRH group; and
notifying the UE of the strength of the signal transmitted by the reception RRH group and information for interference measurement for each of the at least one RRH group,
wherein the notified information for interference measurement includes time information of the wireless resource for measuring interference and the time information is defined by a number of interference measurement resources (IMR) included in N subframes.

2. The method of claim 1, wherein the reference signal includes a CSI-RS (Channel Status Information Reference Signal).

3. The method of claim 1, wherein the determining of the reference signal includes determining a single reference signal with respect to the reception RRH group.

4. The method of claim 1, wherein the wireless resource includes a reference signal transmitted by an RRH group adjacent to the reception RRH group among the at least one RRH group, or a predetermined muting pattern.

5. The method of claim 1, wherein the notifying includes notifying the UE of the strength of the signal transmitted by the reception RRH group and the information for interference measurement for each of the at least one RRH group, using higher layer signaling.

6. A method for performing interference measurement in a user equipment (UE) of a communication system in which at least one remote radio head (RRH) group is arranged in distributed locations within a single cell, the method comprising:
receiving, from an enhanced Node B (eNB), a strength of a signal transmitted by a reception RRH group for transmitting a signal other than an interference signal to the UE among the at least one RRH group and information for interference measurement for the at least one RRH group;
measuring, when it is determined that a resource for interference measurement is allocated by checking the received information for interference measurement, interference using the allocated resource for interference measurement;
receiving a reference signal from the reception RRH group, and generating channel status information using an amount of the measured interference; and
transmitting the channel status information to the eNB,
wherein the received information for interference measurement includes time information of a wireless resource for measuring interference and the time information is defined by a number of interference measurement resource (IMIR) included in N subframes.

7. The method of claim 6, wherein the measuring of the interference further includes measuring, when it is determined that the resource for interference measurement is not allocated by checking the received information for interference measurement, the interference using a CRS (Cell specific Reference Signal).

8. The method of claim 6, wherein the received information includes at least one of a channel status information-reference signal (CSI-RS) measurement set, an interference measurement set, and channel status information feedback-related information.

9. The method of claim 6, wherein the resource for interference measurement includes a channel status information-reference signal (CSI-RS) allocated to an RRH group adjacent to the reception RRH group among the at least one RRH group, or a predetermined muting pattern.

10. The method of claim 6, wherein the receiving includes receiving the strength of the signal and the information for interference measurement, through higher layer signaling.

11. An enhanced Node B (eNB) of a communication system in which at least one remote radio head (RRH) group is arranged in distributed locations within a single cell, the eNB comprising:
a receiver configured to receive a signal from a user equipment (UE;
a transmitter configured to transmit a signal to the UE; and
a processor configured to:
determine a reception RRH group for transmitting a signal other than an interference signal to the UE among the at least one RRH group;
determine a reference signal for measuring a strength of the signal transmitted by the reception RRH group;
determine a wireless resource for measuring interference for each of the at least one RRH group; and notify the UE of the strength of the signal transmitted by the reception RRH group and information for interference measurement for each of the at least one RRH group, wherein the notified information for interference measurement includes time information of the wireless resource for measuring interference and the time information is defined by a number of interference measurement resources (IMR) included in N subframes.

12. The eNB of claim 11, wherein the reference signal includes a channel status information-reference signal (CSI-RS).

13. The eNB of claim 11, wherein the processor is further configured to determine a single reference signal with respect to the reception RRH group.

14. The eNB of claim 11, wherein the wireless resource includes a reference signal transmitted by an RRH group adjacent to the reception RRH group among the at least one RRH group, or a predetermined muting pattern.

15. The eNB of claim 11, wherein the processor is further configured to notify the UE of the strength of the signal transmitted by the reception RRH group and the information for interference measurement for each of the at least one RRH group, using higher layer signaling.

16. A user equipment (UE) of a communication system in which at least one remote radio head (RRH) group is arranged in distributed locations within a single cell, the UE comprising:
   a receiver configured to receive a signal from an enhanced Node B (eNB);
   a transmitter configured to transmit the signal to the eNB; and
   a processor configured to:
      receive, from the eNB, a strength of a signal transmitted by a reception RRH group for transmitting a signal other than an interference signal to the UE among the at least one RRH group and information for interference measurement for the at least one RRH group;
      measure, when it is determined that a resource for interference measurement is allocated by checking the received information for interference measurement, interference using the allocated resource for interference measurement;
      receive a reference signal from the reception RRH group and generate channel status information using an amount of the measured interference; and
      transmit the channel status information to the eNB,
   wherein the received information for interference measurement includes time information of a wireless resource for measuring interference and the time information is defined by a number of interference measurement resource (IMR) included in N subframes.

17. The UE of claim 16, wherein the processor is further configured to measure, when it is determined that the resource for interference measurement is not allocated by checking the received information for interference measurement, the interference using a CRS.

18. The UE of claim 16, wherein the received information includes at least one of a channel status information-reference signal (CSI-RS) measurement set, an interference measurement set, and channel status information feedback-related information.

19. The UE of claim 16, wherein the resource for interference measurement includes a channel status information-reference signal (CSI-RS) allocated to an RRH group adjacent to the reception RRH group among the at least one RRH group, or a predetermined muting pattern.

20. The UE of claim 16, wherein the processor is further configured to receive the strength of the signal and the information for interference measurement, through higher layer signaling.

* * * * *